United States Patent
Guidry et al.

(10) Patent No.: US 11,970,920 B2
(45) Date of Patent: Apr. 30, 2024

(54) ZERO-GAP HANGER SYSTEMS AND METHODS

(71) Applicant: Cameron International Corporation, Houston, TX (US)

(72) Inventors: Kirk Guidry, Cypress, TX (US); Dennis P. Nguyen, Pearland, TX (US); Barret Heinrich, Houston, TX (US)

(73) Assignee: Cameron International Corporation, Houston, AS (US)

( * ) Notice: Subject to any disclaimer, the term of this patent is extended or adjusted under 35 U.S.C. 154(b) by 163 days.

(21) Appl. No.: 17/651,276

(22) Filed: Feb. 16, 2022

(65) Prior Publication Data
US 2022/0259938 A1 Aug. 18, 2022

Related U.S. Application Data

(60) Provisional application No. 63/151,518, filed on Feb. 19, 2021, provisional application No. 63/150,010, filed on Feb. 16, 2021.

(51) Int. Cl.
*E21B 33/043* (2006.01)
*F16J 15/12* (2006.01)

(52) U.S. Cl.
CPC ............. *E21B 33/043* (2013.01); *F16J 15/12* (2013.01); *E21B 2200/01* (2020.05)

(58) Field of Classification Search
CPC .................................. E21B 33/04; F16J 15/12
See application file for complete search history.

(56) References Cited

U.S. PATENT DOCUMENTS

| | | | | |
|---|---|---|---|---|
| 2,094,812 A | * | 10/1937 | Penick | E21B 33/04 166/88.4 |
| 4,832,125 A | * | 5/1989 | Taylor | E21B 33/043 166/212 |
| 5,307,879 A | * | 5/1994 | Kent | E21B 33/04 166/182 |
| 5,735,344 A | * | 4/1998 | Duncan | E21B 33/04 166/123 |
| 6,662,868 B1 | | 12/2003 | Van Bilderbeek | |

(Continued)

FOREIGN PATENT DOCUMENTS

| | | |
|---|---|---|
| EP | 0320135 A1 | 6/1989 |
| WO | 2015187279 A1 | 12/2015 |
| WO | 2022177899 A1 | 8/2022 |

OTHER PUBLICATIONS

International Search Report and Written Opinion issued in PCT/US2022/016450, dated Jun. 2, 2022 (11 pages).

*Primary Examiner* — Shane Bomar
(74) *Attorney, Agent, or Firm* — Jeffrey D. Frantz

(57) ABSTRACT

A hanger system for use with a housing of a wellhead includes a hanger assembly. The hanger assembly includes a hanger having a respective radially-outer surface and a radially-extending surface, as well as a first annular wedge having a respective radially-outer surface with a first annular wedge surface texture. The radially-extending surface is configured to engage a shoulder of the housing of the wellhead while the hanger assembly is in a landed position within the housing of the wellhead, and the first annular wedge surface texture is configured to engage a respective-radially inner surface of the housing of the wellhead while the hanger assembly is in a sealed position within the housing of the wellhead.

20 Claims, 7 Drawing Sheets

(56) References Cited

U.S. PATENT DOCUMENTS

| | | | |
|---|---|---|---|
| 2004/0104024 A1* | 6/2004 | Kent | F16K 31/1225 |
| | | | 166/85.4 |
| 2010/0126736 A1* | 5/2010 | Ellis | E21B 33/04 |
| | | | 166/387 |
| 2011/0203810 A1* | 8/2011 | Nguyen | E21B 33/04 |
| | | | 166/387 |
| 2011/0284206 A1* | 11/2011 | Nguyen | E21B 33/03 |
| | | | 166/75.11 |
| 2013/0020095 A1* | 1/2013 | Vanderford | E21B 19/06 |
| | | | 166/208 |
| 2016/0290094 A1* | 10/2016 | Nguyen | E21B 23/04 |
| 2016/0319657 A1 | 11/2016 | Szpunar et al. | |
| 2017/0191335 A1* | 7/2017 | Nguyen | E21B 33/04 |
| 2018/0163491 A1* | 6/2018 | Nguyen | E21B 33/04 |
| 2018/0163520 A1* | 6/2018 | Navar | E21B 33/0355 |
| 2018/0179829 A1* | 6/2018 | Nguyen | E21B 23/04 |
| 2019/0078397 A1* | 3/2019 | Nguyen | E21B 33/038 |
| 2021/0270104 A1* | 9/2021 | Løvoll | E21B 33/043 |

\* cited by examiner

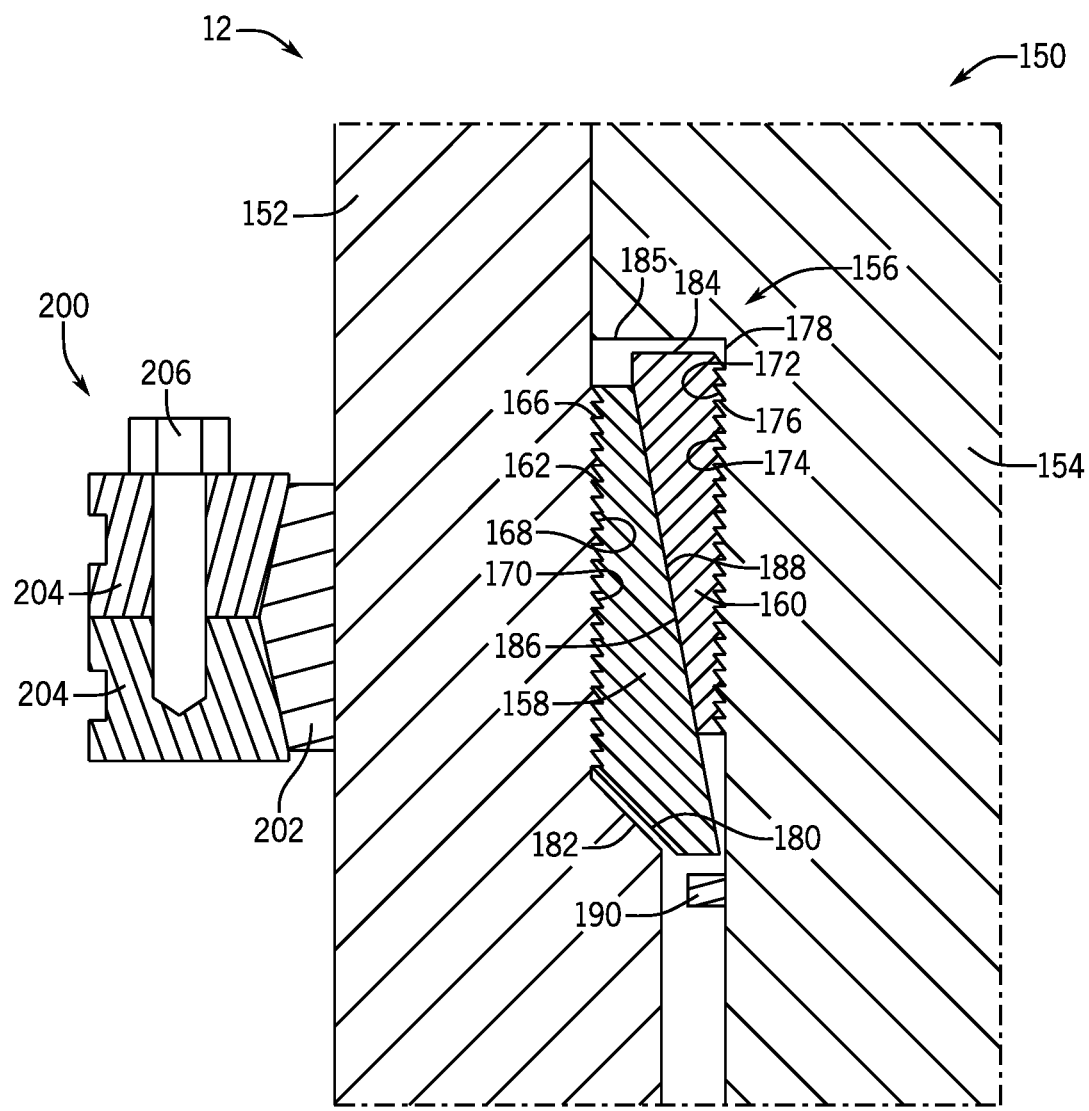
FIG. 4
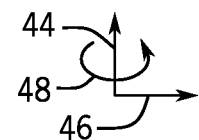

ZERO-GAP HANGER SYSTEMS AND METHODS

CROSS-REFERENCE TO RELATED APPLICATION

This application claims priority to and the benefit of U.S. Provisional Application No. 63/151,518, entitled "ZERO-GAP HANGER SYSTEMS AND METHODS" and filed Feb. 19, 2021 and of U.S. Provisional Application No. 63/150,010, entitled "HANGER SYSTEMS AND METHODS" and filed Feb. 16, 2021, which are incorporated by reference herein in its entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Natural resources, such as oil and gas, are used as fuel to power vehicles, heat homes, and generate electricity. Once a desired natural resource is discovered below the surface of the earth, mineral extraction systems are often employed to access and extract the desired natural resource. The mineral extraction systems may be located onshore or offshore depending on the location of the desired natural resource. The mineral extraction systems generally include a wellhead through which the desired natural resource is extracted. The wellhead may include or be coupled to a wide variety of components, such as a tubing hanger that supports a tubing, a casing hanger that supports a casing, valves, fluid conduits, and the like.

SUMMARY

In one embodiment, a hanger system for use with a housing of a wellhead includes a hanger assembly. The hanger assembly includes a hanger having a respective radially-outer surface and a radially-extending surface, as well as a first annular wedge having a respective radially-outer surface with a first annular wedge surface texture. The radially-extending surface is configured to engage a shoulder of the housing of the wellhead while the hanger assembly is in a landed position within the housing of the wellhead, and the first annular wedge surface texture is configured to engage a respective-radially inner surface of the housing of the wellhead while the hanger assembly is in a sealed position within the housing of the wellhead.

In one embodiment, a hanger system for use with a housing of a wellhead includes a hanger assembly, wherein the hanger assembly includes a hanger, a first annular wedge and a second annular wedge, wherein the second annular wedge circumferentially surrounds the hanger, the first annular wedge circumferentially surrounds the second annular wedge, and the first annular wedge includes a respective radially-outer surface with a first annular wedge surface texture. The hanger system also includes a clamp configured to compress the housing of the wellhead toward the hanger assembly to form a respective seal between the first annular wedge surface texture and the housing of the wellhead.

In one embodiment, a method includes running, with a hanger running tool, a hanger assembly into a housing of a wellhead, wherein the hanger assembly includes a hanger and a first annular wedge with a first annular wedge surface texture. The method also includes setting the hanger assembly in a landed position within the housing of the wellhead via contact between a radially-extending surface of the hanger assembly and a shoulder of the housing of the wellhead. The method further includes subsequently actuating a clamp to compress the housing of the wellhead toward the hanger assembly to form a respective seal between the first annular wedge surface texture and the housing of the wellhead.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein:

FIG. 4 is a cross-sectional side view of an embodiment of a portion of a hanger system that may be utilized within a wellhead of the mineral extraction system of FIG. 1;

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain embodiments of the present disclosure generally relate to a hanger system that is configured to be positioned within a wellhead. The hanger system may include a tubing hanger that is configured to support a tubing (e.g., tubing string) and/or a casing hanger that is configured to support a casing (e.g., casing string). The hanger system may utilize a seal system that includes one or more annular wedges, such as a pair of annular wedges and one or more surfaces with a surface texture (e.g., surface feature, surface profile, POS-GRIP®). For example, opposed and/or complementary surface textures may be provided on a radially-inner annular surface of a housing of the wellhead and a radially-outer annular surface of a first annular wedge of the hanger system. Then, the opposed and/or complementary surface textures may form a seal (e.g., annular seal) when the radially-inner annular surface of the housing of the wellhead and the radially-outer annular surface of the first annular wedge of the hanger system are brought together (e.g., via radial compression with one or more clamps).

Figure 1:
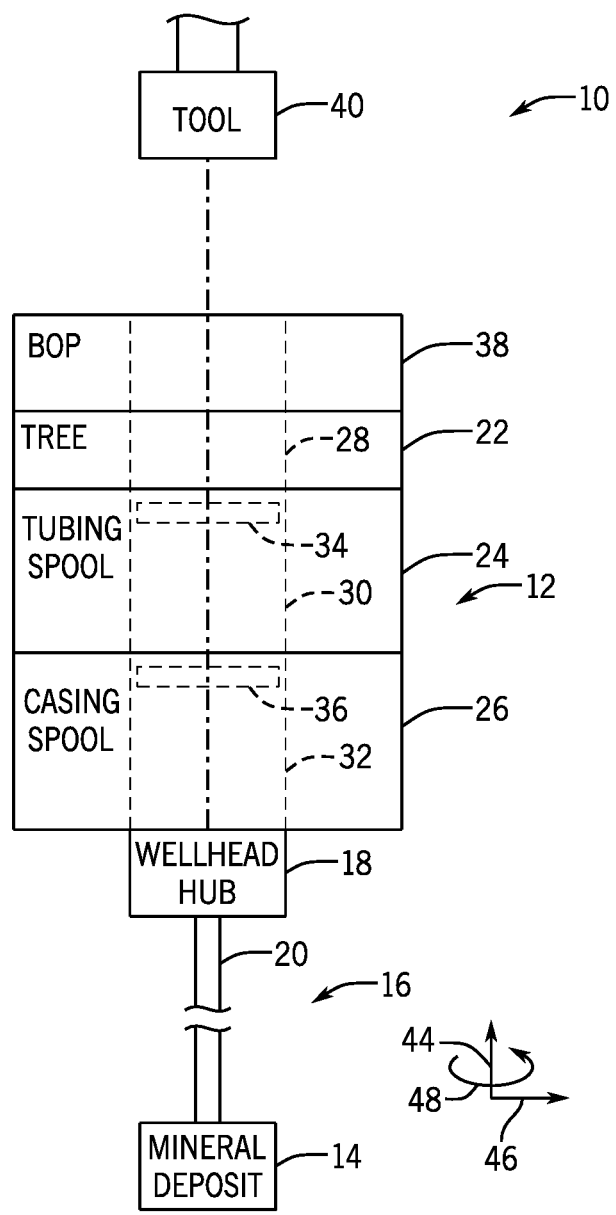
FIG. 1 is a block diagram of a mineral extraction system, in accordance with an embodiment of the present disclosure.

FIG. 1 is a block diagram of an embodiment of a mineral extraction system 10. The mineral extraction system 10 may be utilized to extract various natural resources (e.g., hydrocarbons, such as oil and/or natural gas) from the earth. As illustrated, the mineral extraction system 10 includes a wellhead 12 coupled to a mineral deposit 14 via a well 16. The well 16 may include a wellhead hub 18 and a wellbore 20. The wellhead hub 18 generally includes a large diameter hub disposed at an end of the wellbore 20 and is configured to connect the wellhead 12 to the wellbore 20. As will be appreciated, the wellbore 20 may contain elevated pressures. For example, the wellbore 20 may include pressures that exceed 10,000, 15,000, or even 20,000 pounds per square inch (psi). Accordingly, the mineral extraction system 10 may employ various mechanisms, such as seals, plugs, and valves, to control and regulate the well 16.

In the illustrated embodiment, the mineral extraction system 10 includes a tree 22, a tubing spool 24, a casing spool 26, and a blowout preventer (BOP) 38. The tree 22 generally includes a variety of flow paths (e.g., bores), valves, fittings, and controls for operating the well 16. Further, the tree 22 may provide fluid communication with the well 16. For example, the tree 22 includes a tree bore 28 that provides for completion and workover procedures, such as the insertion of tools into the well 16, the injection of various chemicals into the well 16, and so forth. Further, the natural resources extracted from the well 16 may be regulated and routed via the tree 22. For example, the tree 22 may be coupled to a flowline that is tied back to other components, such as a manifold.

As shown, the tubing spool 24 may provide a base for the tree 22 and includes a tubing spool bore 30 that connects (e.g., enables fluid communication between) the tree bore 28 and the well 16. As shown, the casing spool 26 may be positioned between the tubing spool 24 and the wellhead hub 18 and includes a casing spool bore 32 that connects (e.g., enables fluid communication between) the tree bore 28 and the well 16. Thus, the tubing spool bore 30 and the casing spool bore 32 may provide access to the wellbore 20 for various completion and workover procedures. The BOP 38 may consist of a variety of valves, fittings, and controls to block oil, gas, or other fluid from exiting the well 16 in the event of an unintentional release of pressure or an overpressure condition.

As shown, a tubing hanger 34 is positioned within the tubing spool 24. The tubing hanger 34 may be configured to support tubing (e.g., a tubing string) that is suspended in the wellbore 20 and/or to provide a path for control lines, hydraulic control fluid, chemical injections, and so forth. Additionally, as shown, a casing hanger 36 is positioned within the casing spool 26. The casing hanger 36 may be configured to support casing (e.g., a casing string) that is suspended in the wellbore 20. A tool 40 (e.g., hydraulic tool) may be utilized to lower the tubing hanger 34 into the tubing spool 24 and/or the casing hanger 36 into the casing spool 26. As discussed in more detail below, a seal system (e.g., a setting system) may provide a seal (e.g., annular seal) between the tubing hanger 34 and the tubing spool 24 and/or a seal (e.g., annular seal) between the casing hanger 36 and the casing spool 26. To facilitate discussion, the mineral extraction system 10, and the components therein, may be described with reference to an axial axis or direction 44, a radial axis or direction 46, and a circumferential axis or direction 48.

Figure 2:
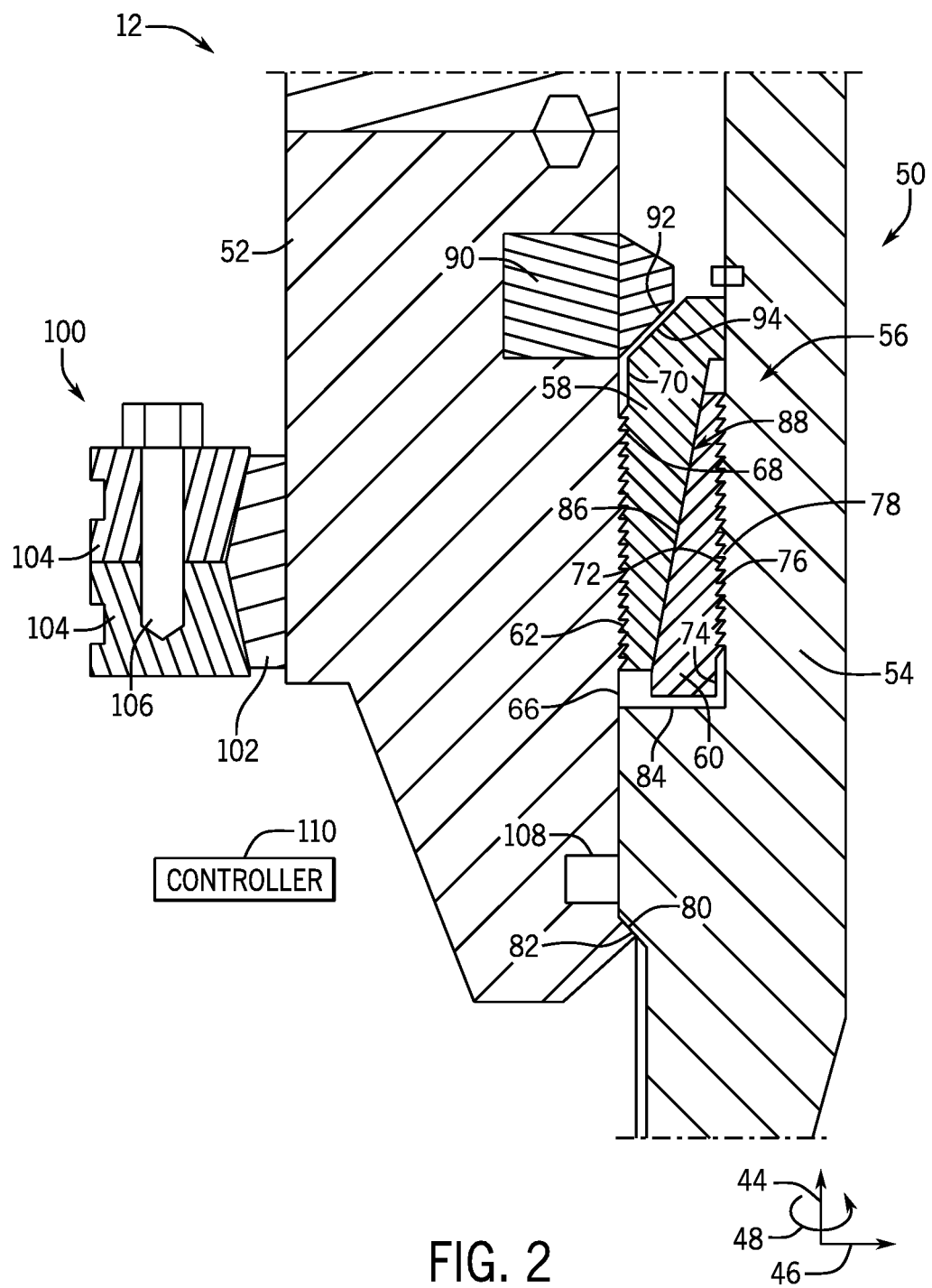
FIG. 2 is a cross-sectional side view of an embodiment of a portion of a hanger system that may be utilized within a wellhead of the mineral extraction system of FIG. 1.

FIG. 2 is a cross-sectional side view of an embodiment of a portion of a hanger system 50 that may be utilized within a wellhead of the mineral extraction system of FIG. 1. As shown, the wellhead 12 includes a housing 52 (e.g., annular housing, such as the tubing spool 24 or the casing spool 26 of FIG. 1), and the hanger system 50 includes a hanger 54 (e.g., annular hanger body, such as the tubing hanger 34 or the casing hanger 36 of FIG. 1) within the housing 52.

The hanger system 50 may also include a seal system 56 (e.g., a setting system) that includes a pair of annular wedges and one or more surfaces with a surface texture (e.g., surface feature, surface profile, POS-GRIP®). The pair of annular wedges may include a first annular wedge 58 (e.g., radially-outer wedge) and a second annular wedge 60 (e.g., radially-inner wedge). As shown, the first annular wedge 58 may be positioned radially-outwardly of the second annular wedge 60, such that the first annular wedge 58 circumferentially surrounds the second annular wedge 60 and/or such that at least portions of the first annular wedge 58 and the second annular wedge 60 overlap with respect to the axial axis 44. Together, the hanger 54, the first annular wedge 58, and the second annular wedge 60 (and any surface texture(s) thereon) may form a hanger assembly. The one or more surfaces with the surface texture may include a housing surface texture 62 on a radially-inner annular surface 66 of the housing 52 of the wellhead 12, a first annular wedge surface texture 68 on a radially-outer annular surface 70 of the first annular wedge 58, a second annular wedge surface texture 72 on a radially-inner annular surface 74 of the second annular wedge 60, and/or a hanger surface texture 76 on a radially-outer annular surface 78 of the hanger 54.

In operation, a tool (e.g., the tool 40 of FIG. 1) may lower the hanger 54, the first annular wedge 58, and the second annular wedge 60 into the housing 52 of the wellhead 12 (e.g., together; at the same time). The tool may lower the hanger 54 until the hanger assembly reaches a landed position in which a surface 80 (e.g., axially-facing surface and/or radially-extending surface) of the hanger 54 contacts a shoulder 82 (e.g., axially-facing surface and/or radially-extending surface) of the housing 52 of the wellhead 12. In the landed position, the first annular wedge 58 and the second annular wedge 60 may be positioned between a portion of the radially-inner annular surface 66 of the housing 52 (which may have the housing surface texture 62) and a portion of the radially-outer annular surface 78 of the hanger 54 (which may have the hanger surface texture 76).

In the landed position, the second annular wedge 60 may contact and be supported on a hanger shoulder 84 (e.g., axially-facing surface and/or radially-extending surface) of the hanger 54. Furthermore, the first annular wedge 58 may contact and be supported on the second annular wedge 60. In particular, the first annular wedge 58 and the second annular wedge 60 may have oppositely inclined tapered surfaces (e.g., annular surfaces), such as a first tapered surface 86 and a second tapered surface 88 that enable the first annular wedge 58 to be supported on the second annular wedge 60. In some embodiments, one or more lock elements 90 (e.g., one or more lock screws or a lock ring) may be driven radially-inwardly from the housing 52 such that one or more tapered surfaces 92 of the one or more lock elements 90 contact a tapered surface 94 (e.g., annular surface; oppositely inclined compared to the one or more tapered surfaces 92) of the first annular wedge 58. In this way, the one or more lock elements 90 may block the first annular wedge 58 and the second annular wedge 60 from moving in the axial direction 44 away from the hanger shoulder 84.

Once the first annular wedge 58 and the second annular wedge 60 are positioned between the portion of the radially-inner annular surface 66 of the housing 52 and the portion of the radially-outer annular surface 78 of the hanger 54 (e.g., in the landed position with the one or more lock elements 90 in a lock position to engage the first annular wedge 58), a clamp 100 (e.g., clamp system; compression system) may be actuated to drive the housing 52 radially-inwardly toward the hanger 54. The clamp 100 may have any suitable form to provide compression between the housing 52 and the hanger 54 along the radial axis 46. For example, as shown, the clamp 100 may include a wedge structure 102, a flange 104, and one or more fasteners 106.

The wedge structure 102 may be an annular wedge structure or a ring that has radially-outer surfaces that taper from a center line or portion to outer edges or portions (e.g., a width along the radial axis 46 at the center line or portion is greater than respective widths along the radial axis 46 at the outer edges or portions). The flange 104 may be an annular flange that includes two annular rings stacked along the axial axis 44 (e.g., stacked and spaced apart along the axial axis 44 at least in some configurations) and that receive the one or more fasteners 106. The one or more fasteners 106 may be spaced apart along the circumferential axis 48 and are configured to rotate to tighten/cause one or both of the annular rings of the flange 104 to move to be closer together along the axial axis 44. The one or more fasteners 106 may be spaced apart along the circumferential axis 48 and are configured to rotate to tighten/cause one or both of the annular rings of the flange 104 to move to be closer together along the axial axis 44. Thus, one or both of the annular rings of the flange 104 slide along the wedge structure 102 (e.g., along tapered surfaces of the wedge structure 102) to drive the wedge structure 102 and the housing 52 to move along the radial axis 46 toward the hanger 54.

As the housing 52 moves along the radial axis 46, the housing 52 causes the one or more surface textures to contact and seal against opposing surfaces (which may have respective surface textures). For example, the first annular wedge surface texture 68 may contact and seal against the portion of the radially-inner annular surface 66 of the housing 52 (which may have the housing surface texture 62), and the second annular wedge surface texture 72 the portion of the radially-outer annular surface 78 of the hanger 54 (which may have the hanger surface texture 76). The first tapered surface 86 of the first annular wedge 58 and the second tapered surface 88 of the second annular wedge 60 are also driven to contact and engage one another. Although not shown, it should be appreciated that the first tapered surface 86 of the first annular wedge 58 and/or the second tapered surface 88 of the second annular wedge 60 may each include respective surface textures.

The hanger system 50 may be considered to be a zero-gap hanger system because the hanger assembly (e.g., the hanger 54 of the hanger assembly) contacts the housing 52 (e.g., via an interface between the surface 80 and the shoulder 82) prior to formation of the seal(s) via the surface texture(s). This contact prior to the formation of the seal(s) via the surface texture(s) and/or prior to the compression via the clamp 100 may provide various advantages, such as improved engagement of the surface texture(s) upon the compression, and thus, more effective seal(s) via the surface texture(s). Additionally, the hanger system 50 may be considered to be in a sealed position (e.g., set position) once each contact and engagement of the surface texture(s) forms a respective seal, such as a metal-to-metal seal, that blocks fluid flow across the respective seal. It should be appreciated that the surface textures may be machined onto the respective surfaces. In some embodiments, the surface textures may be hardened to facilitating engagement with other surfaces. For example, the first annular wedge surface texture 68 may have a first hardness (e.g., via material selection and/or a treatment process, such as nitriding and/or heat treatment) that is greater than a second hardness of the radially-inner annular surface 66 (or the housing surface texture 62, if present) of the housing 52 to facilitate the engagement with the housing 52. Similarly, the second annular wedge surface texture 72 may have a first hardness (e.g., via material selection and/or a treatment process, such as nitriding and/or heat treatment) that is greater than a second hardness of the radially-outer annular surface 78 (or the hanger surface texture 76, if present) of the hanger 54 to facilitate the engagement with the hanger 54.

Furthermore, the mating or engaged surfaces may have corresponding (e.g., complementary) textures or profiles, such as teeth, that facilitate formation of a friction fit (e.g., enhanced grip) to provide the seal and/or to block separation (e.g., relative movement along the axial axis 44). For example, the second annular wedge surface texture 72 and the hanger surface texture 76 may each include teeth, wherein the teeth of the second annular wedge surface texture 72 are offset along the axial axis 44 from the teeth of the hanger surface texture 76 in order to overlap along the radial axis 46 and/or interlock with one another (e.g., upon being driven toward one another; one tooth on one surface texture is received between adjacent teeth of the other surface texture) to facilitate formation of the enhanced friction fit to provide the engagement and/or the seal. However, it should be appreciated that opposed surface textures (e.g., teeth) may be aligned and not offset along the axial axis 44.

While FIG. 2 illustrates surface textures on four different surfaces/components, it should be appreciated that the hanger system 50 may include one or more of the surface textures in any suitable combination to form one or more seals in an annular space between the housing 52 and the hanger 54. For example, the hanger system 50 may include only the housing surface texture 62 to contact and engage the radially-outer annular surface 70 of the first annular wedge 58, wherein the radially-outer annular surface 70 of the first annular wedge 58 is devoid of the surface texture (e.g., may be smooth, such as without radially-outwardly extending teeth and/or relatively smooth compared to the radially-inner annular surface 66 of the housing 52). The hanger system 50 may include only the first annular wedge surface texture 68 to contact and engage the radially-inner annular surface 66 of the housing 52, wherein the radially-inner annular surface 66 of the housing 52 is devoid of the surface texture (e.g., may be smooth, such as without radially-inwardly extending teeth and/or relatively smooth compared to the radially-outer annular surface 70 of the first annular wedge 58). The hanger system 50 may include only the hanger surface texture 76 to contact and engage the radially-inner annular surface 74 of the second annular wedge 60, wherein the radially-inner annular surface 74 of the second annular wedge 60 is devoid of the surface texture (e.g., may be smooth, such as without radially-inwardly extending teeth and/or relatively smooth compared to the radially-outer annular surface 78 of the hanger 54). The hanger system 50 may include only the second annular wedge surface texture 72 to contact and engage the radially-outer annular surface 78 of the hanger 54, wherein the radially-outer annular surface 78 of the hanger 54 is devoid of the surface texture (e.g., may be smooth, such as without radially-outwardly extending teeth and/or relatively smooth compared to the radially-inner annular surface 74 of the second annular wedge 60).

The hanger system 50 may also include any combination of the surface textures, such as the first annular wedge surface texture 68 and the second annular wedge surface texture 72, wherein the radially-inner annular surface 66 of the housing 52 and the radially-outer annular surface 78 of the hanger 54 are devoid of the surface texture. As another example, the hanger system 50 may include the housing surface texture 62 and the hanger surface texture 76, wherein the wedges 58, 60 (or at least the radially-outer annular surface 70 of the first annular wedge 58 and the radially-inner annular surface 74 of the second annular wedge 60) are devoid of the surface texture. As another example, the hanger system 50 may include the first annular wedge surface texture 68, the second annular wedge surface texture 72, and the hanger surface texture 76, wherein the radially-inner annular surface 66 of the housing 52 is devoid of the surface texture. Thus, the surface textures may be configured to engage and seal against opposing surface textures and/or smooth surfaces.

Additionally, in FIG. 2, the housing 52 includes the shoulder 82 and the hanger 54 includes the surface 80; however, these features may be omitted and/or not used to align the hanger 54 within the housing 52. In such cases, the hanger 54 may be aligned and/or properly positioned within the housing 52 (e.g., aligned with the clamp 100; the housing surface texture 62, if present; and/or other features of the housing) via other techniques. For example, one or more sensors 108 (e.g., digital sensors; acoustic sensors, optical sensors, contact sensors) may be positioned within the housing 52 to detect a position of the hanger 54 within the housing 52 and/or to detect seal(s) formed with surface texture(s).

The one or more sensors 108 may be configured to generate signals (e.g., data) that are indicative of a position of the hanger 54 within the housing 52. The one or more sensors 108 are communicatively coupled (e.g., wirelessly or wired) to a controller 110 (e.g., electronic controller) and provide the signals to the controller 110. The controller 110 processes the signals to determine the position of the hanger 54 within the housing 52. The controller 110 may compare the signals to one or more patterns or profiles (e.g., generated based on empirical or modeled data; stored in a memory device or a storage device) to determine the position of the hanger 54 within the housing 52. For example, the controller 110 may select a particular pattern or profile for the hanger 54 (e.g., based on features, such as a size of the hanger 54 and/or the surface texture(s)), and the controller 110 may compare the signals to the particular pattern or profile.

Then, after or upon identifying that the signals correspond to (e.g., match, such as substantially match) the particular pattern or profile, the controller 110 may determine that the position of the hanger 54 corresponds to a final position (e.g., an aligned position; the landed position) in which the hanger 54 is aligned with the clamp 100 and/or an appropriate portion of the housing 52 (e.g., with the housing surface texture 62, when present). Furthermore, in response to determining that the hanger 54 is in the final position, the controller 110 may provide one or more outputs. For example, the one or more outputs may include displayed information on a display screen for visualization by an operator, control signals to control the tool that moves the hanger 54 through the housing 52, and/or control signals to control the clamp 100 (e.g., to adjust compression on the housing 52).

In some embodiments, the one or more sensors 108 may include one or more acoustic sensors (e.g., piezoelectric sensors; vibration sensors) that are configured to monitor vibrations (e.g., acoustic waves) generated by the hanger 54 with the wedges 58, 60 moving through the housing 52. In particular, the one or more sensors 108 may detect vibrations generated due to (e.g., induced by) contact (e.g., sliding contact) between surfaces (e.g., surface texture(s)) and/or structures as the hanger assembly moves through the housing 52.

The one or more sensors 108 may be one or more acoustic sensors that are configured to emit and to detect acoustic waves (e.g., reflected from the hanger 54 and/or the wedges 58, 60) that indicate a presence of and the position of the hanger 54. The one or more sensors 108 may be one or more optical sensors that are configured to emit and to detect light (e.g., reflected from the hanger 54 and/or the wedges 58, 60) that indicate the presence of and the position of the hanger 54. The one or more sensors 108 may also be configured to emit and to detect the acoustic waves or the light to more particularly detect the presence of and the position of the surface texture(s) (e.g., the first annular wedge surface texture 68; due to certain patterns in the reflected acoustic waves or the light from the surface texture(s)). The one or more sensors 108 may include one or more mechanical sensors, such as contact sensors, that are configured to provide outputs (e.g., signals) that are indicative of the position of the hanger 54 within the housing 52. For example, contact with the contact sensors indicates that the hanger 54 is in the final position within the housing 52.

With or without the shoulder 82 of the housing 52 and the surface 80 of the hanger 54, the hanger system 50 may include the one or more sensors 108 to enable seal monitoring techniques to assess a degree of engagement and/or effectiveness of seal(s) formed across an annular gap between the housing 52 and the hanger 54. For example, the one or more sensors 108 may be positioned within the housing 52 and/or at the clamp 100 to detect a deformation of the housing 52 and/or components of the clamp 100. Thus, the one or more sensors 108 may include one or more strain sensors (e.g., strain gauges, strain meters).

The one or more sensors 108 may generate the signals indicative of the deformation, and the controller 110 may process the signals to determine that the housing 52 and/or the clamp 100 has reached a target deformation and/or a target deflection. For example, the controller 110 may access the target deformation that represents an expected deformation during an appropriate degree of engagement and/or effective sealing. Then, upon determining that the deformation measured by the one or more sensors 108 corresponds to the target deformation, the controller 110 may determine that there is effective engagement and/or sealing between the hanger 54 and the housing 52.

Additionally, it should be appreciated that the one or more sensors 108 may be acoustic sensors that enable (e.g., indirect) detection of the degree of engagement and/or effectiveness of seal(s). For example, the controller 110 may access the one or more patterns or profiles that represent expected vibrations (e.g., over time) as the degree of engagement increases to be adequate and/or the effectiveness of the seal increases to be adequate (e.g., fully sealed). Thus, a single sensor and/or a group of sensors of a single/same sensor type, such as acoustic sensors, may monitor both position and seal efficacy. However, any combination of different sensor types may be used in any suitable combination. Furthermore, the one or more sensors 108 may be present when the housing 52 includes the shoulder 82 and the hanger 54 includes the surface 80, and the one or more sensors 108 may provide confirmation and/or additional information regarding the alignment, position, and/or seal efficacy.

Figure 3:
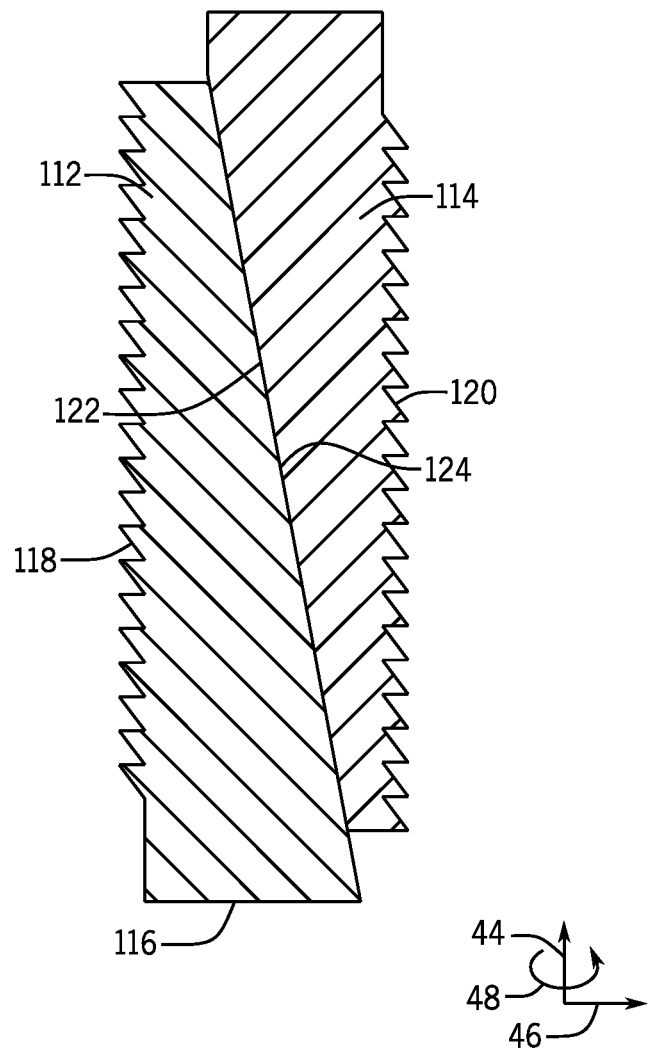
FIG. 3 is a cross-sectional side view of an embodiment of a pair of annular wedges that may be part of a hanger system that may be utilized within a wellhead of the mineral extraction system of FIG. 1.

FIG. 3 is a cross-sectional side view of an embodiment of a pair of annular wedges that may be utilized in a hanger system within the wellhead 12 of the mineral extraction system 10 of FIG. 1. The pair of annular wedges includes a first annular wedge 112 and a second annular wedge 114. When used with the hanger 54 of FIG. 2, the first annular wedge 112 and the second annular wedge 114 may generally replace the first annular wedge 58 and the second annular wedge 60 shown in FIG. 2. As such, when used with the hanger 54 of FIG. 2, a surface 116 of the first annular wedge 112 contacts and is supported on the hanger shoulder 84 of the hanger 54. Furthermore, when used with the hanger 54 and lowered into the housing 52 of FIG. 2, the first annular wedge 112 and the second annular wedge 114 are positioned between the housing 52 (which may have the housing surface texture 62 on the radially-inner annular surface 66 of the housing 52) and the hanger 54 (which may have the hanger surface texture 76 on the radially-outer annular surface 78 of the hanger 54). Then, the clamp 100 of FIG. 2 may be actuated to drive the housing 52 radially-inwardly toward the hanger 54 to form respective seals with the one or more surface textures, such as a seal between the housing 52 and a first annular wedge surface texture 118 of the first annular wedge 112 and/or to form a seal between the hanger 54 and a second annular wedge surface texture 120 of the second annular wedge 114.

The first annular wedge 112 and the second annular wedge 114 may also have oppositely inclined tapered surfaces (e.g., annular surfaces), such as a first tapered surface 122 and a second tapered surface 124 that enable the second annular wedge 114 to be supported on the first annular wedge 112. The first tapered surface 122 and the second tapered surface 124 may each include surface texture. It should be appreciated that the pair of annular wedges of FIG. 3 may be utilized with the one or more lock elements 90 of FIG. 2 or with any other suitable structure that is configured to block movement of the pair of annular wedges along the axial axis 44 (e.g., away from the hanger shoulder 84). Indeed, the pair of annular wedges of FIG. 3 may be utilized with any of the features and/or have any of the variations described with reference to FIG. 2 (e.g., the sensors 108; the controller 110; one or more of the surface texture(s) alone or in any combination; surface 80 and/or shoulder 82 interface).

FIG. 4 is a cross-sectional side view of an embodiment of a portion of a hanger system 150 that may be utilized within the wellhead 12 of the mineral extraction system 10 of FIG. 1. As shown, the wellhead 12 includes a housing 152 (e.g., annular housing, such as the tubing spool 24 or the casing spool 26 of FIG. 1), and the hanger system 150 includes a hanger 154 (e.g., annular hanger body, such as the tubing hanger 34 or the casing hanger 36 of FIG. 1) within the housing 152.

The hanger system 150 may also include a seal system 156 (e.g., a setting system) that includes a pair of annular wedges and one or more surfaces with a surface texture (e.g., surface feature, surface profile, POS-GRIP®). The pair of annular wedges may include a first annular wedge 158 (e.g., radially-outer wedge) and a second annular wedge 160 (e.g., radially-inner wedge). As shown, the first annular wedge 158 may be positioned radially-outwardly of the second annular wedge 160, such that the first annular wedge 158 circumferentially surrounds the second annular wedge 160 and/or such that at least portions of the first annular wedge 158 and the second annular wedge 160 overlap with respect to the axial axis 44. Together, the hanger 154, the first annular wedge 158, and the second annular wedge 160 (and any surface texture(s) thereon) may form a hanger assembly. The one or more surfaces with the surface texture may include a housing surface texture 162 on a radially-inner annular surface 166 of the housing 152 of the wellhead 12, a first annular wedge surface texture 168 on a radially-outer annular surface 170 of the first annular wedge 158, a second annular wedge surface texture 172 on a radially-inner annular surface 174 of the second annular wedge 160, and/or a hanger surface texture 176 on a radially-outer annular surface 178 of the hanger 154.

In operation, a tool (e.g., the tool 40 of FIG. 1) may lower the hanger 154, the first annular wedge 158, and the second annular wedge 160 into the housing 152 of the wellhead 12 (e.g., together; at the same time). The tool may lower the hanger 154 until the hanger assembly reaches a landed position in which a surface 180 of the first annular wedge 158 contacts a shoulder 182 of the housing 152 of the wellhead 12. In the landed position, the first annular wedge 158 and the second annular wedge 160 may be positioned between the radially-inner annular surface 166 of the housing 152 (which may have the housing surface texture 162) and the radially-outer annular surface 178 of the hanger 154 (which the hanger surface texture 176). In some embodiments, one or more retainers 190 (e.g., annular retainer rings; radially-outwardly extending ring or protrusions) may contact (e.g., at least until the hanger 154 reaches the landed position) and retain the wedges 158, 160 against the hanger 154 as the tool lowers the hanger 154 and the wedges 158, 160 together into the housing 152.

In the landed position, the hanger 154 may contact and be supported on a wedge surface 184 (e.g., axially-facing surface and/or radially-extending surface) of the second annular wedge 160. In particular, a hanger surface 185 (e.g., axially-facing surface and/or radially-extending surface) of the hanger 154 may contact and be supported on the wedge surface 184 of the second annular wedge 160. Furthermore, the second annular wedge 160 may contact and be supported on the first annular wedge 158. In particular, the first annular wedge 158 and the second annular wedge 160 may have oppositely inclined tapered surfaces (e.g., annular surfaces), such as a first tapered surface 186 and a second tapered surface 188 that enable the second annular wedge 160 to be supported on the first annular wedge 158. Thus, a weight of the hanger 154 may drive the first annular wedge 158 and the second annular wedge 160 toward the shoulder 182 of the housing 152. Additionally or alternatively, a hydraulic or mechanical set tool may drive the first annular wedge 158 and the second annular wedge 160 toward the shoulder 182 of the housing 152.

In the landed position, a clamp 200 may be actuated to drive the housing 152 radially-inwardly toward the hanger 154. The clamp 200 may have any suitable form to provide compression between the housing 152 and the hanger 154 along the radial axis 46. For example, as shown and with features that are the same or similar to FIG. 2, the clamp 200 may include a wedge structure 202, a flange 204, and one or more fasteners 206. The one or more fasteners 206 are configured to rotate to tighten/cause the flange 204 to move along the axial axis 44 to thereby drive the wedge structure 202 and the housing 152 to move along the radial axis 46.

As the housing 152 moves along the radial axis 46, the housing 152 causes the one or more surface textures to contact and seal against opposing surfaces (which may have respective surface textures). For example, the housing surface texture 162 may contact and engage the first annular wedge surface texture 168, and the hanger surface texture 176 may contact and engage the second annular wedge surface texture 172. The first tapered surface 186 of the first annular wedge 158 and the second tapered surface 188 of the second annular wedge 160 are also driven to contact and engage one another. Although not shown, it should be appreciated that the first tapered surface 186 of the first annular wedge 158 and the second tapered surface 188 of the second annular wedge 160 may each include opposed and/or complementary surface textures.

The hanger system 150 may be considered to be a zero-gap hanger system because the hanger assembly (e.g., the hanger 154 of the hanger assembly) contacts the housing 152 (e.g., via an interface between the surface 180 and the shoulder 182) prior to formation of the seal(s) via the surface texture(s). Additionally, the hanger system 50 may be considered to be in a sealed position (e.g., set position) once each contact and engagement of the surface texture(s) may form a respective seal, such as a metal-to-metal seal, that blocks fluid flow across the respective seal. It should be appreciated that the surface textures may be machined onto the respective surfaces. In some embodiments, the surface textures may be hardened to facilitating engagement with other surfaces. Furthermore, the mating or engaged surfaces may have corresponding (e.g., complementary) textures or profiles, such as teeth, that facilitate formation of a friction fit (e.g., enhanced grip) to provide the seal and/or to block separation (e.g., relative movement along the axial axis 44). Indeed, the hanger system 150 of FIG. 4 may be utilized with any of the features and/or have any of the variations described with reference to FIG. 2 (e.g., the sensors 108; the controller 110; one or more of the surface texture(s) alone or in any combination; no surface 180 and/or shoulder 182 interface).

Figure 5:
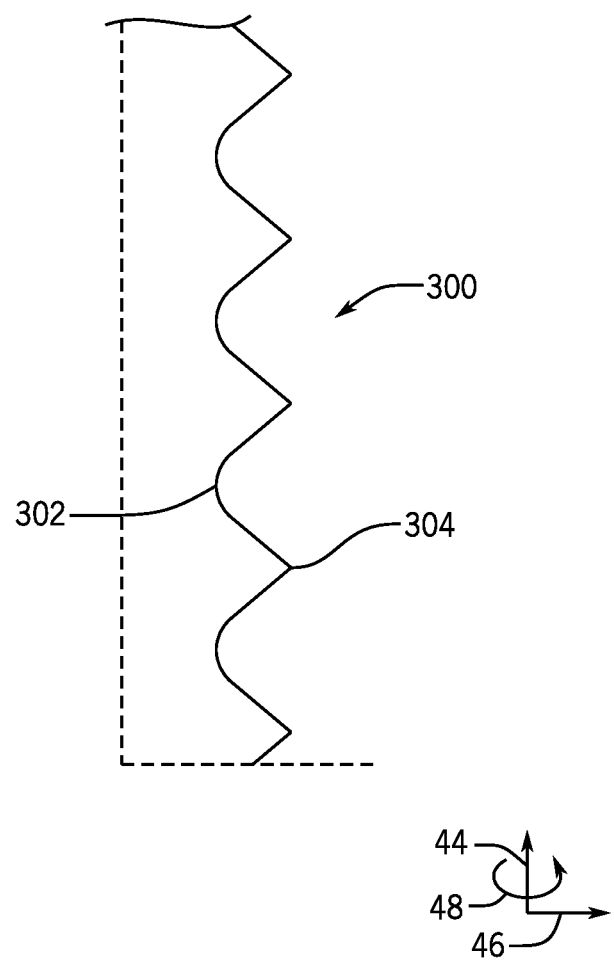
FIG. 5 is a cross-sectional side view of an embodiment of a surface texture that may be utilized to form a seal in an annular space between a hanger and a wellhead of the mineral extraction system of FIG. 1.

FIG. 5 is a cross-sectional side view of an embodiment of a surface texture 300 that may be used to form a seal in an annular space between a hanger assembly (e.g., with the hanger 54 and/or the hanger 154) and a housing (e.g., the housing 52 and/or the housing 152). For example, the surface texture 300 may be representative of any of the various surface textures (e.g., the first annular wedge surface texture, the second annular wedge surface texture, the housing surface texture, and/or the hanger surface texture) shown and described with reference to FIGS. 2-4.

The surface texture 300 is provided on a radially-facing annular surface 302 and includes multiple teeth 304 that protrude from the radially-facing annular surface 302. The multiple teeth 304 may include pointed edges (e.g., annular edges) that extend about all or a portion of a circumference of the radially-facing annular surface 302 and are spaced apart along the axial axis 44 (e.g., by a distance/spacing between adjacent teeth). The multiple teeth 304 are not configured and/or operated to form a threaded interface (e.g., when engaged with a complementary annular structure, such as opposed teeth, the multiple teeth 304 block movement along the axial axis 44 and do not convert rotational movement to axial movement along the axial axis 44 as would occur with a threaded interface). In some embodiments, the multiple teeth 304 are not helical or angled with respect to the axial axis 44 (e.g., each of the multiple teeth 304 extends along the circumferential axis 48). As shown, the multiple teeth 304 may form a series of valleys and troughs or a wave-like shape in the cross-sectional side view.

Any of the surface textures disclosed herein may be the same or different (e.g., with respect to characteristics, such as shape, spacing [along the axial axis 44], density [number of teeth or protrusions per surface area unit], height or degree of protrusion from the radially-facing annular surface 302), and/or alignment (e.g., not helical and extend only along the circumferential axis 48; helical to extend along both the axial axis 44 and the circumferential axis 48). Additionally or alternatively, any of the surface textures may be uniform or non-uniform. Additionally or alternatively, the surface textures may vary based on a size (e.g., inner diameter) of the housing, features (e.g., size, such as outer diameter and/or weight) of the respective hanger, and/or conditions (e.g., expected operating conditions and/or environmental conditions) at the wellhead. For example, a set of hangers may include hangers of different sizes. In such cases, for one hanger with a first, smaller inner diameter, the surface texture may have certain characteristics (e.g., a first density). However, for another hanger with a second, larger inner diameter, the surface texture may have certain characteristics (e.g., a second density, which may be less than the first density).

Figure 6:
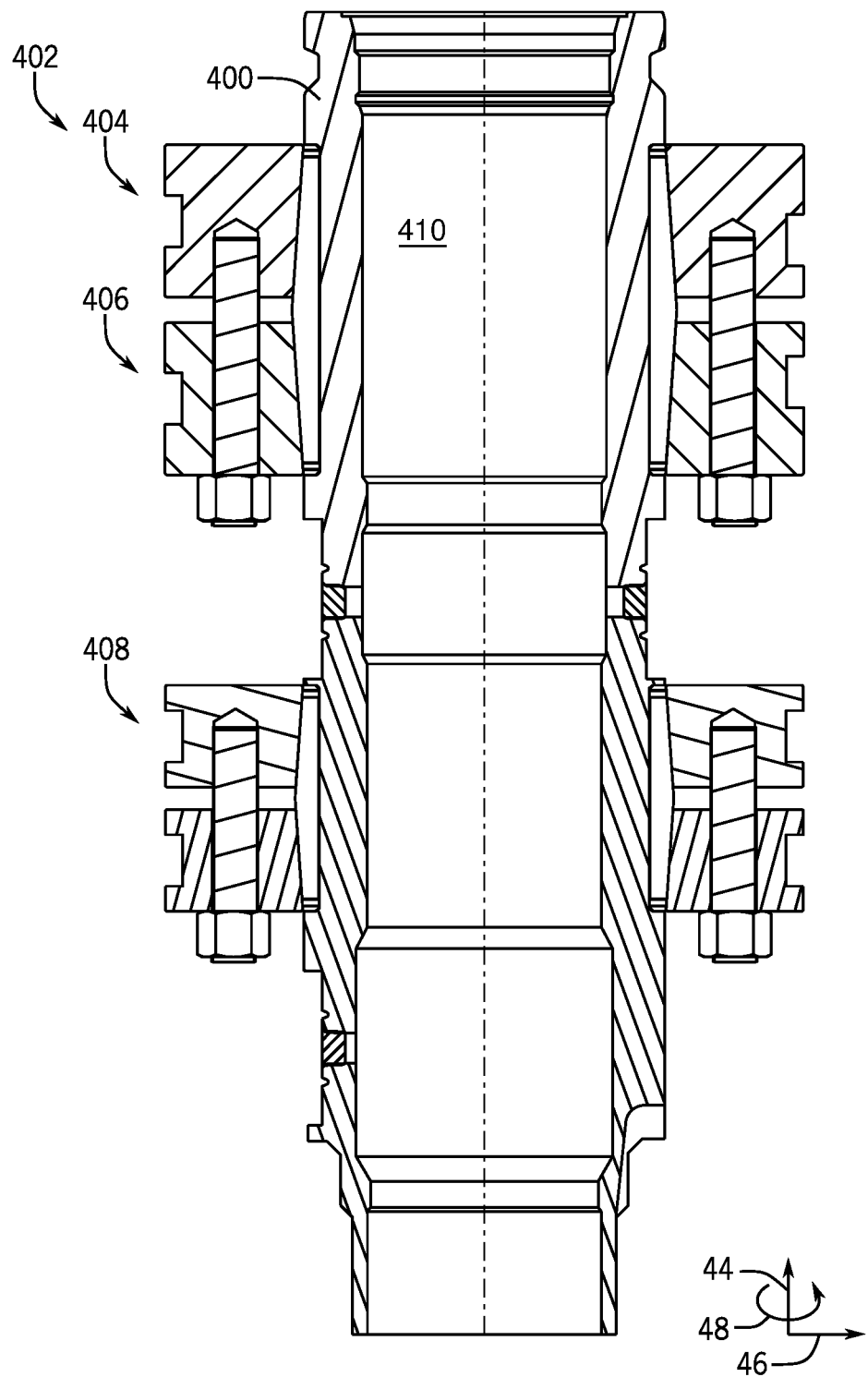
FIG. 6 is a cross-sectional side view of an embodiment of a portion of a housing of a wellhead of the mineral extraction system of FIG. 1, wherein a compression system is coupled to the housing.

FIG. 6 is a cross-sectional side view of an embodiment of a portion of a housing 400 of a wellhead 402, wherein a compression system 404 includes a first clamp 406 and a second clamp 408 coupled to the housing 400. The first clamp 406 and/or the second clamp 408 may have any of the features described above with the respect to the clamps 100, 200. In operation, the hanger assembly (e.g., the hanger 54 with the wedges 58, 60; the hanger 154 with the wedges 158, 160) may be lowered into a bore 410 of the housing 400. For example, a casing hanger may be lowered into the bore 410 to align with and seal within the bore 410 via actuation of the second clamp 408, and then a tubing hanger may be lowered into the bore 410 to align with and seal within the bore 410 via actuation of the first clamp 406.

Figure 7:
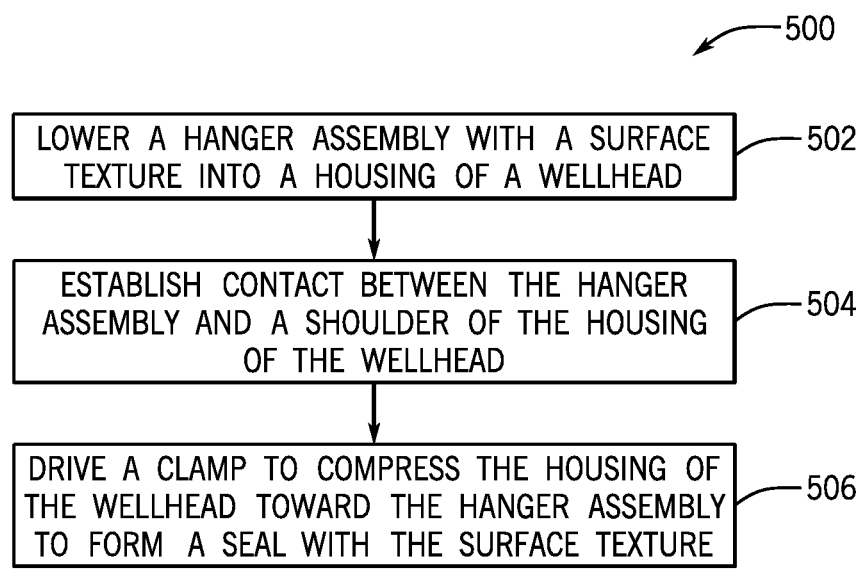
FIG. 7 is a flow diagram of an embodiment of a method of installing a hanger assembly in a wellhead of a mineral extraction system.

FIG. 7 is a flow diagram of an embodiment of a method 500 of installing a hanger assembly in a wellhead of a mineral extraction system. The method 500 may be performed as an automated procedure by a system, such as by the controller 110 shown in FIG. 2. Although the flow diagram illustrates the steps in a certain sequence, it should be understood that the steps may be performed in any suitable order and certain steps may be carried out simultaneously, where appropriate. Further, certain steps shown in FIG. 7 may be omitted and additional steps may be added.

In step 502, the method 500 may begin by lowering a hanger assembly (e.g., a hanger and annular wedges that circumferentially surround the hanger) into the housing of the wellhead. For example, the controller may provide control signals to a tool actuator that adjusts a tool that supports the hanger assembly and lowers the hanger assembly into the housing of the wellhead. The hanger assembly may have one or more surface texture(s) that are configured to facilitate engagement and sealing in an annular space between the hanger and the housing of the wellhead. For example, the hanger assembly may include a first wedge surface texture on a first wedge, a second wedge surface texture on a second wedge, and/or a hanger surface texture on the hanger.

In step 504, the hanger assembly may contact a shoulder of the housing of the wellhead. At this point, the hanger assembly is in a landed position within the wellhead. In step 506, a clamp may be actuated or driven to compress the housing of the wellhead toward the hanger assembly to form a seal(s) with the one or more surface texture(s). For example, the first wedge surface texture may engage and seal against a radially-inner surface of the housing (which may have a housing surface texture) to form a respective seal, and/or the second wedge surface texture may engage and seal against a radially-outer surface of the hanger (which may have the hanger surface texture) to form a respective seal. As noted herein, any combination of surface textures may be provided to form one or more seals in the annular space between the hanger and the housing of the wellhead.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the invention as defined by the following appended claims. For example, while the illustrated embodiments show a hanger and a housing of a wellhead, it should be understood that the systems and methods may be adapted to for use with any of a variety of other annular structures.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A hanger system for use with a housing of a wellhead, the hanger system comprising:
    a hanger assembly, comprising:
        a hanger comprising a respective radially-outer surface and a radially-extending surface; and
        a first annular wedge comprising a respective radially-outer surface with a first annular wedge surface texture;
        wherein the radially-extending surface is configured to engage a shoulder of the housing of the wellhead while the hanger assembly is in a landed position within the housing of the wellhead, and the first annular wedge surface texture is configured to engage and seal against a respective radially-inner surface of the housing of the wellhead while the hanger assembly is in a sealed position within the housing of the wellhead.

2. The hanger system of claim 1, comprising a tool, wherein the tool is configured to lower the hanger and the first annular wedge together into the housing of the wellhead.

3. The hanger system of claim 1, wherein the hanger assembly comprises a second annular wedge comprising a respective radially-inner surface with a second annular wedge surface texture, and the second annular wedge surface texture is configured to engage the respective radially-outer surface of the hanger.

4. The hanger system of claim 3, wherein the second annular wedge is configured to circumferentially surround the hanger, and the first annular wedge is configured to circumferentially surround the second annular wedge.

5. The hanger system of claim 3, wherein the first annular wedge comprises a first tapered surface, and the second annular wedge comprises a second tapered surface that is oppositely inclined from the first tapered surface, and the first tapered surface and the second tapered surface are configured to contact one another while the hanger assembly is in the sealed position within the housing of the wellhead.

6. The hanger system of claim 5, wherein at least one of the first tapered surface or the second tapered surface comprises a respective surface texture.

7. The hanger system of claim 3, wherein the respective radially-outer surface of the hanger comprises a hanger surface texture, and the second annular wedge surface texture is configured to engage the hanger surface texture while the hanger assembly is in the sealed position within the housing of the wellhead.

8. The hanger system of claim 1, wherein the first annular wedge surface texture is configured to engage the respective-radially inner surface of the housing of the wellhead, and the respective-radially inner surface of the housing of the wellhead is devoid of a corresponding surface texture.

9. The hanger system of claim 1, comprising a clamp coupled to the housing of the wellhead and configured to drive the housing of the wellhead radially-inwardly to cause the first annular wedge surface texture to engage the respective-radially inner surface of the housing of the wellhead.

10. The hanger system of claim 1, wherein the hanger system is a tubing hanger system configured to support a tubing string or a casing hanger system configured to support a casing string.

11. The hanger system of claim 1, comprising one or more sensors configured to detect a position of the hanger assembly within the wellhead, an efficacy of a seal formed with the first annular wedge surface texture, or both.

12. The hanger system of claim 1, wherein the first annular wedge surface texture comprises a plurality of teeth that extend circumferentially about the first annular wedge.

13. A hanger system for use with a housing of a wellhead, comprising:
    a hanger assembly, comprising:
        a hanger; and
        a first annular wedge and a second annular wedge, wherein the second annular wedge circumferentially surrounds the hanger, the first annular wedge circumferentially surrounds the second annular wedge, and the first annular wedge comprises a respective radially-outer surface with a first annular wedge surface texture; and
    a clamp configured to compress the housing of the wellhead toward the hanger assembly to form a respective seal between the first annular wedge surface texture and the housing of the wellhead.

14. The hanger system of claim 13, wherein the first annular wedge comprises a first tapered surface, the second annular wedge comprises a second tapered surface that is oppositely inclined from the first tapered surface, and the first tapered surface and the second tapered surface are configured to contact one another while the hanger assembly is in a sealed position within the housing of the wellhead.

15. The hanger system of claim 13, wherein the hanger assembly comprises a radially-extending surface that is configured to engage a shoulder of the housing of the wellhead while the hanger assembly is in a landed position within the housing of the wellhead.

16. The hanger system of claim 13, wherein the hanger system is a tubing hanger system configured to support a tubing string or a casing hanger system configured to support a casing string.

17. The hanger system of claim 13, wherein the first annular wedge surface texture comprises a plurality of teeth that extend circumferentially about the first annular wedge.

18. A method, comprising:
running, with a hanger running tool, a hanger assembly into a housing of a wellhead, wherein the hanger assembly comprises a hanger and a first annular wedge with a first annular wedge surface texture;
setting the hanger assembly in a landed position within the housing of the wellhead via contact between a radially-extending surface of the hanger assembly and a shoulder of the housing of the wellhead; and
subsequently actuating a clamp to compress the housing of the wellhead toward the hanger assembly to form a respective seal between the first annular wedge surface texture and the housing of the wellhead.

19. The method of claim 18, wherein the hanger assembly comprises a second annular wedge with a second annular wedge surface texture, and the method comprises actuating the clamp to compress the housing of the wellhead toward the hanger assembly to form a respective seal between the second annular wedge surface texture and the hanger.

20. The method of claim 18, comprising detecting, with one or more sensors, at least one of a position of the hanger assembly within the wellhead or an efficacy of the respective seal formed between the first annular wedge surface texture and the housing of the wellhead.

* * * * *